(12) United States Patent
Parras

(10) Patent No.: US 8,271,179 B2
(45) Date of Patent: Sep. 18, 2012

(54) SYSTEM AND METHOD FOR AIDING AIRDROP COMPUTATIONS

(75) Inventor: Gerald Parras, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 1101 days.

(21) Appl. No.: 11/503,814

(22) Filed: Aug. 14, 2006

(65) Prior Publication Data

US 2008/0078881 A1     Apr. 3, 2008

(51) Int. Cl.
    *B64C 1/22* (2006.01)
(52) U.S. Cl. ........................................ 701/102
(58) Field of Classification Search .................. 701/120, 701/3, 213; 340/961; 342/24, 36, 357.53
    See application file for complete search history.

(56) References Cited

U.S. PATENT DOCUMENTS

| | | | |
|---|---|---|---|
| 3,979,086 A * | 9/1976 | MacAdam ................... | 244/3.19 |
| 5,878,819 A | 3/1999 | Denoize et al. | |
| 5,904,724 A * | 5/1999 | Margolin ...................... | 701/120 |
| 6,308,043 B1 * | 10/2001 | Solheim et al. .............. | 455/63.1 |
| 6,549,162 B1 * | 4/2003 | Gage et al. ................... | 342/353 |
| 7,082,296 B2 * | 7/2006 | Zavidniak ..................... | 455/410 |
| 2005/0143904 A1 | 6/2005 | Haas ............................. | 701/120 |
| 2006/0255916 A1 * | 11/2006 | Cox ............................. | 340/10.1 |

FOREIGN PATENT DOCUMENTS

EP    1 538 076 A1    6/2005

OTHER PUBLICATIONS

Jenny M. Stein, Chris M. Madsen, and Alan L. Strahan, "An Overview of the Guided parafoil System derived from X-38 Experience", NASA Johnson Space Center, Houston, Texas 77058,18th AIAA Aeriodynamic decelerator Systems technology Conference and Seminar, Munic, Germany, May 23-26, 2005, Conference Paper Abstract, AIAA Paper 2005-1652.*
Jenny M. Stein, Chris M. Madsen, and Alan L. Strahan, "Overview of the Guided parafoil System derived from X-38 Experience", Nasa Johnson Space Center, Houston, Texas 77058,18th AIAA Aeriodynamic decelerator Systems technology Conference and Seminar, Munic, Germany, May 23-26, 2005, Conference Paper Abstract, AIAA Paper 2005-1652.*
Michael R. Wuest and Richard J. Benney, Precision Airdrop, Dec. 2005, North Atlantic Treaty Organisation, Research and Technology Organisation, AC/323/(SCI-125)TP/125, RTO AGARDograph 3000, Flight Test Techniques Series-vol. 24, pp. 2-1 to 2-9. Two documents attached ( i.e. AG-300-V24-12 and AG-300-V24-ALL).*
C-17 Globemaster III, McDonnell Douglas, Jiri Wagner Jun. 2006.*
European Search Report from corresponding EP Application No. 07114102.2, mailed Sep. 10, 2009, 5 pages.
Wright, Robert "Wind-profile Precision Air Delivery System (WindPADS)", PSI, www.PlanningSystemsInc.com, Jul. 2001.

(Continued)

*Primary Examiner* — James Trammell
(74) *Attorney, Agent, or Firm* — Ingrassia Fisher & Lorenz, P.C.

(57) ABSTRACT

A system and method for aiding airdrop computations is described. The system includes a ground system, a data link, and an airborne system. The ground system accumulates substantially real time drop zone GPS and meteorological data, which is transferred to the airborne system via the data link. The airborne system makes adjustments to a release point of the airdrop based on the data received from the ground system. Additionally, the airborne system provides airdrop status to the ground system via the data link.

19 Claims, 4 Drawing Sheets

OTHER PUBLICATIONS

"AGAS—Affordable Guided Airdrop System," http://www.vertigo-inc.com/apas/ printed on Jul. 14, 2006.
"Pilot Balloon—Flight Calculator," http://www.pilotballoon.com/calculat.htm, Sep. 2000.
Brenner, Martin "Pilot Balloon Winds Calculation," 2005.
"Drop Zones," Global Security.org, http://www.globalsecurity.org/military/library/policy/army/fm/57-38/Ch6.htm, Apr. 27, 2005.
EP examination report for 07 114 102.2, dated May 15, 2012.
Wright R. et al.; Precision Airdrop System, 18th AIAA Aerodynamics Decelerator Systems Technology Conference and Seminar, May 25, 2005, Munich, URL:http://nsrdec.natick.army.mil/LIBRARY/00-09/R05-59.pdf.
Wuest, M. R. et al.; Precision Airdrop, North Atlantic Treaty Organisation, Research and Technology Organisation, Flight Test Techniques Series—vol. 24, RTO-AG-300-V2, Published Dec. 2005.

* cited by examiner

SYSTEM AND METHOD FOR AIDING AIRDROP COMPUTATIONS

FIELD

The present invention relates generally to airdrops, and more particularly, relates to a system and method for aiding airdrop computations and providing ground personnel with real time status of the airdrop mission.

BACKGROUND

An airdrop may be performed to deliver supplies, equipment, and/or personnel to areas that may otherwise be too difficult to reach due to distance, terrain, hostilities, climate, or other reasons. Prior to the airdrop, ground personnel at the drop zone location may take measurements, such as surface and ballistic winds, QNH (a Q code that refers to the barometric altimeter setting that will cause the altimeter to read altitude above mean sea level within a certain defined region), temperature, and desired point of impact in the drop zone. The information obtained by the ground personnel is then transmitted via radio (i.e., voice transmission) to the cargo transport aircraft, where the flight crew manually inputs the airdrop information into a computer. The computer then calculates a Computed Air Release Point (CARP).

Additionally or alternatively, the flight crew of the cargo transport aircraft may obtain airdrop data by dropping a device that transmits data back to the aircraft. Using the data from the dropped device, the computer calculates a CARP for the airdrop. The aircraft then loops back to complete the airdrop, requiring at least one more pass over the drop zone.

Unfortunately, with both of these methods for communicating airdrop data to the flight crew, the conditions may have changed after the computer calculated the CARP. As a result, the airdrop may not land in the drop zone. When airdrops do not reach the desired point of impact, disastrous results may occur. For example, humanitarian aid may not reach the people for which it was designed to help. The dropped supplies may be either lost and unused, or used by unintended parties. As another example, personnel may land in hostile areas endangering their lives. The cost of inaccurate airdrops may be immeasurable.

Thus, it would be beneficial to have a system and method for aiding airdrop computations that result in more accurate airdrops. As a result, supplies and equipment will reach the intended parties, and personnel will arrive where they are needed.

SUMMARY

A system and method for aiding airdrop computations is described. The system includes a ground system, an airborne system, and a data link. The ground system includes a first computer that receives data from a plurality of sensors. The airborne system includes a second computer that calculates a release point for an airdrop maneuver. The data link provides a communication pathway between the ground system and the airborne system. The sensor data received by the first computer is communicated to the second computer via the data link. The second computer calculates the release point based on the sensor data. The second computer may also communicate the status of the airdrop maneuver to the first computer via the data link.

The plurality of sensors may provide position and meteorological data. The plurality of sensors may include a Global Positioning System. The plurality of sensors may include air data sensors selected from the group consisting of a pilot balloon, a clinometer, an anemometer, a thermometer, and a barometer.

At least one of the sensors may automatically transmit data to the first computer. Additionally or alternatively, the data from at least one of the sensors may be manually entered into the first computer.

The first computer may include a wind calculator algorithm. The second computer may also compute a lateral track for the airborne system to follow during the airdrop maneuver. The data link may be a Link 16 data link.

The system may also include a first data link unit for communicating data between the first computer and the data link, and a second data link unit for communicating data between the second computer and the data link. The first data link unit and the second data link unit may be tactical data link units.

A method for aiding airdrop computations includes receiving substantially real time sensor data from a drop zone via a data link, calculating a release point for an airdrop maneuver based on the received sensor data, and adjusting a flight plan based on the calculated release point. The method may further include obtaining the sensor data from the drop zone, notifying flight crew of the adjusted flight plan, and providing ground crew a status of the airdrop maneuver via the data link.

A method for receiving status of an airdrop maneuver includes providing an initial flight plan for an airdrop maneuver to a computer accessible by ground crew, and providing an updated flight plan for the airdrop maneuver to the computer via a data link as the airdrop maneuver progresses. The updated flight plan includes an adjustment to a release point. The adjustment to the release point may be based on substantially real time sensor data communicated to an aircraft via the data link.

Additionally, the computer may display an aircraft symbol overlaying a lateral track that represents the updated flight plan. The release point may be depicted on the lateral track.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
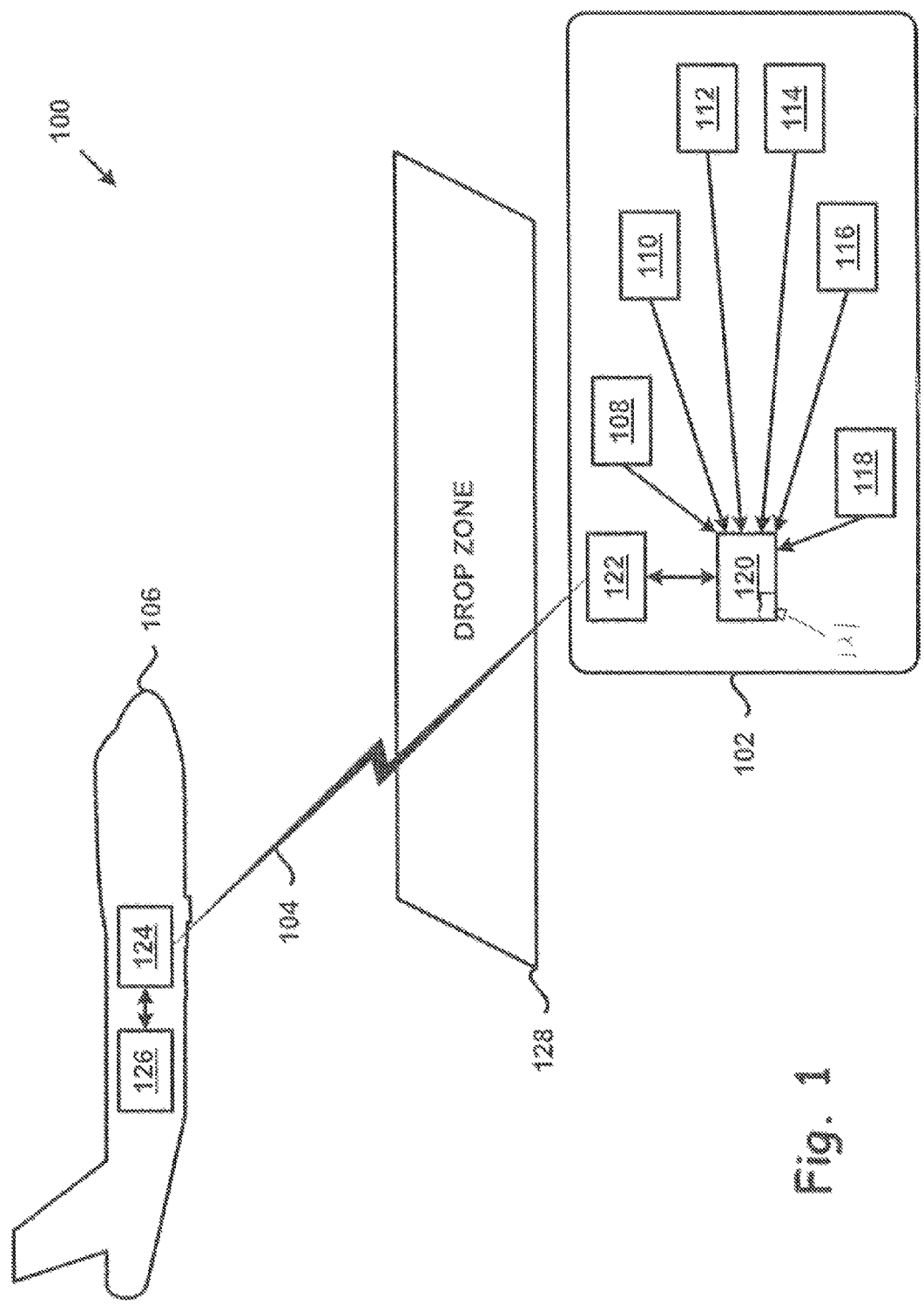
FIG. 1 is a block diagram of a system for aiding airdrop computations, according to an example.

FIG. 1 is a block diagram of a system 100 for aiding airdrop computations. The system 100 includes a ground system 102, a data link 104, and an airborne system 106. Data is exchanged between the ground system 102 and the airborne system 106 via the data link 104. The system 100 provides the airborne system 106 with substantially real time data during an airdrop maneuver to achieve a more accurate airdrop. Additionally, the system 100 provides ground personnel with substantially real time status of the airdrop mission. The ground personal are sometimes referred to as the drop zone support team.

The ground system 102 accumulates substantially real time drop zone Global Positioning System (GPS) and meteorological data for transmitting to the airborne system 106. The ground system 102 receives data from a GPS 108; altitude wind measuring devices, such as a pilot balloon (otherwise known as PIBAL) 110 and a clinometer 112; an anemometer 114 for measuring surface wind; a thermometer 116 for measuring surface temperature, and a barometer 118 for measuring QNH. The ground system 102 may include additional sensors. For example, the ground system may include a theodolite and/or a drift scale in lieu of the clinometer 112 to measure the pilot balloon's ascent.

The ground system 102 also includes an interface unit 120. The interface unit 120 is a computer, such as laptop computer, that includes a display. The interface unit 120 receives the data from the sensors 108-118. One or more of the sensors 108-118 may transmit data to the interface unit 120 directly using either a wired or wireless connection. In this example, the interface unit 120 and the sensors 108-118 may be described as being part of a common network. Alternatively, the ground personnel may enter data from one or more of the sensors 108-118 into the interface unit 120 via a keyboard, a microphone, or other user input device.

The interface unit 120 may also include a wind calculator algorithm 121 for processing the raw data received from the sensors 110-118. The wind calculator algorithm computes the Mean Effective Winds (MEW) for various altitudes using data from the pilot balloon 110. A non-limiting example of a wind calculator algorithm can be found at www.pilotballoon.com/calculat.htm. The interface unit 120 provides the raw and/or processed data to a ground data link unit 122, which provides the data to the data link 104.

The ground data link unit 122 may be a tactical data link unit, such as a Multifunctional Information Distribution System (MIDS). MIDS is the North American Treaty Organization (NATO) name for the communication component of Link 16, which is described with reference to the data link 104. However, other data link units may be used depending on the type of data link 104 used in the system 100. For example, the ground data link unit 112 may be a Joint Tactical Radio System (JTRS), which is currently being developed for Armed Forces communication. Like MIDS, the JTRS will host Link 16.

The data link 104 provides a means for transmitting and receiving data between the ground system 102 and the airborne system 106. Preferably, the data link 104 is a Link 16 data link, which is a military inter-computer data exchange format of NATO. Link 16 is a secure, high-speed digital data link that can exchange data in substantially real time. However, other data link designs now known or developed in the future may also be used in the system 100.

Link 16 uses the joint tactical information distribution system (JTIDS) transmission characteristics and protocols. Airdrop information may be exchanged using these defined transmission characteristics and protocols. For example, Variable Message Format (VMF) utilizing Extensible Markup Language (XML) may be used to format the data exchange.

The airborne system 106 is an aircraft that includes an airborne data link unit 124 and a guidance computer 126. Obviously, the airborne system 106 includes other equipment. For example, the airborne system 106 includes a flight director and/or an autopilot. The airborne system 106 receives the substantially real time data via the airborne data link unit 124, which sends the data to the guidance computer 126. The guidance computer 126 makes adjustments to the airdrop CARP based on this new data.

The airborne data link unit 124 may be a tactical data link unit, such as a MIDS using Link 16. The airborne data link unit 124 may be substantially the same as the ground data link unit 122 located in the ground system 102. Alternatively, the airborne data link unit 124 may have a different design than the ground data link unit 122, but still be able to communicate with the ground data link unit 122 via the data link 104.

The guidance computer 126 may be a CARP guidance computer, such as a Tactical Flight Management System (FMS) with CARP functionality. The guidance computer 126 provides guidance commands and/or guidance cues to the aircraft flight director and/or autopilot. The guidance computer 126 also provides airdrop status information, such as cargo type, cargo amount, green light status, red light status, and completion status to the data link 104 for ground downlink.

The guidance computer 126 computes a lateral track or path for the aircraft to follow. The lateral track includes waypoint locations, which are adjusted based on the uplinked data. The guidance computer 126 then controls the aircraft to the adjusted waypoints.

Figure 2:
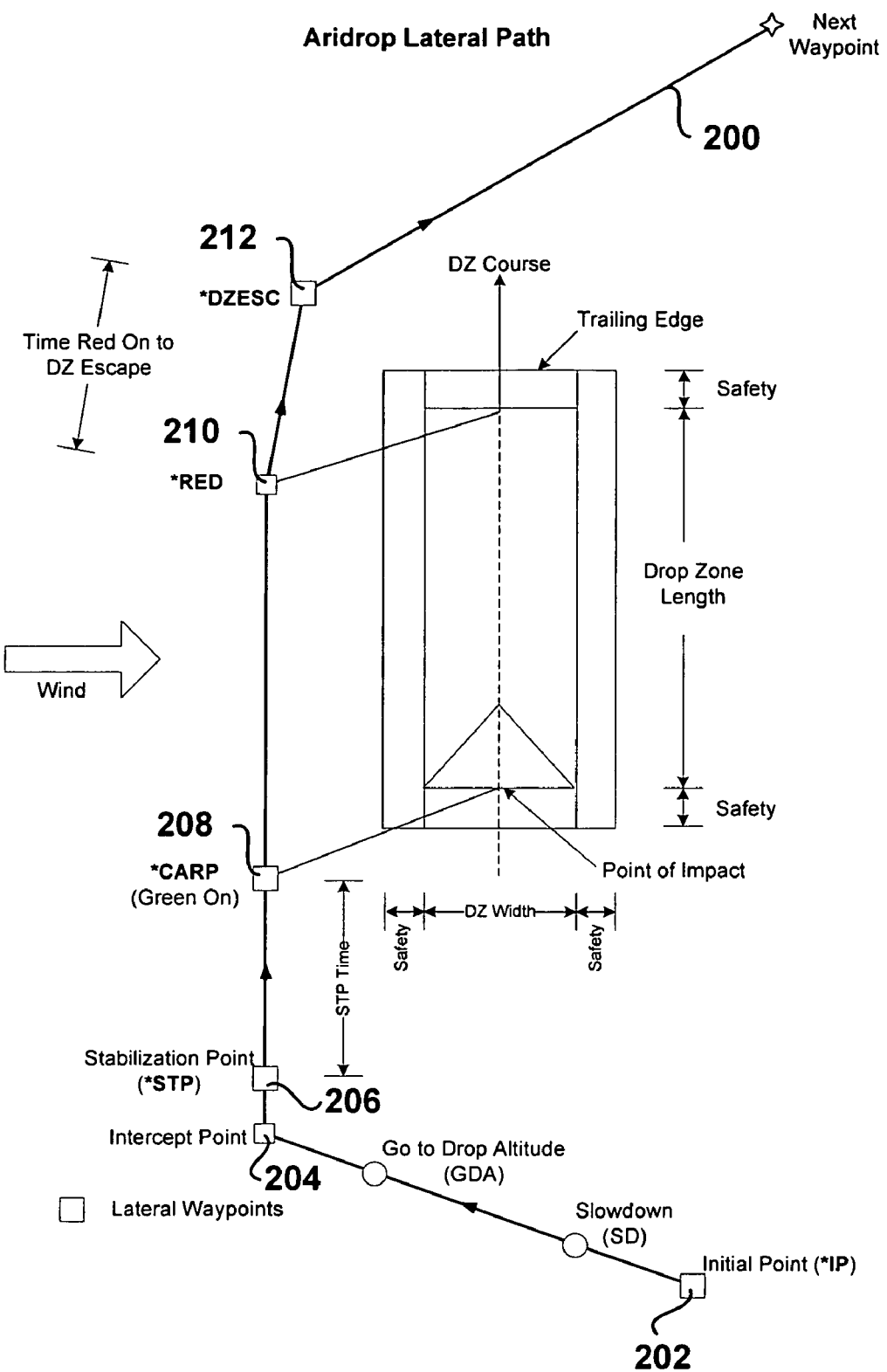
FIG. 2 shows an example lateral track calculated by a guidance computer depicted in FIG. 1.

FIG. 2 shows an example lateral track 200 calculated by the guidance computer 126. The lateral track 200 has several waypoints. An initial point (IP) 202 is the starting point of the lateral track 200. The guidance computer 126 guides the aircraft from the initial point 202 to an intercept point 204. Between the initial point 202 and the intercept point 204, the aircraft speed and altitude may be adjusted to the desired speed and altitude of the airdrop. Typically, the aircraft reduces speed for the airdrop maneuver. The aircraft may be adjusted to either a higher or lower altitude for the airdrop maneuver.

At the intercept point 204, the airdrop maneuver begins. When the aircraft reaches a stabilization point 206, the guidance computer 126 finalizes the CARP calculation for use in the airdrop maneuver. When the aircraft reaches the CARP 208, a green light in the cargo area of the aircraft is illuminated indicating that the cargo should be dropped. The cargo and/or personnel are dropped from the aircraft until a red light illuminates at point 210, indicating the end of the airdrop.

After the airdrop is complete, the guidance computer directs the aircraft to a drop zone escape (DZESC) point 212. If the airdrop mission is complete, the aircraft is directed to the next waypoint, which may be a start to another mission or to a landing destination. Otherwise, the aircraft may be directed to the initial point 202 to make another pass at the drop zone. If the airdrop mission is not complete, the guidance computer 126 continues to calculate the CARP with the new data received from the ground system 102. Thus, the lateral track 200 for each pass may be different as conditions change.

Additionally, the airborne system 106 provides real time airdrop status to the ground system 102. As a result, the ground crew receives better situational awareness of the airdrop mission. The airdrop status data may include pending and completed cargo drop status, including cargo type and quantity; count down to green light and green light status; red light status; and other airdrop status, such as number of passes and drop altitude. The airdrop status data may be provided to the ground system 102 via downlink to the ground data link unit 122. The ground data link unit 122 provides the airdrop status data to the interface unit 120. The interface unit 102 may display a graphical representation of the aircraft's position relative to the drop zone.

Figure 3:
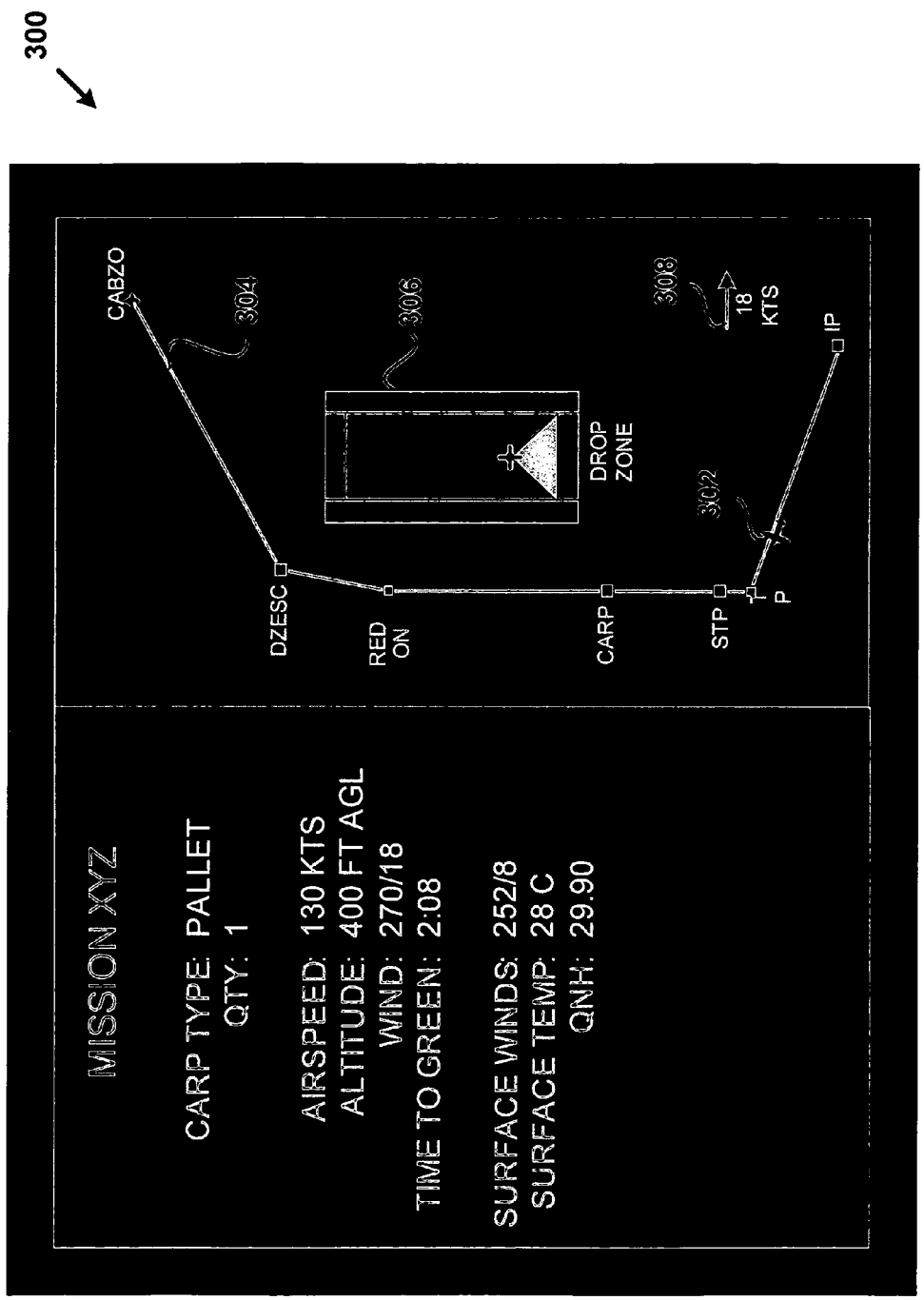
FIG. 3 shows an example screen shot that may be displayed on an interface unit depicted in FIG. 1.

FIG. 3 shows an example screen shot 300 that may be displayed on the interface unit 120. On the left side of the screen shot 300, the airdrop status data for a particular mission (Mission XYZ) is listed. In this example, the airdrop status data includes the cargo type as pallet, the cargo quantity as one (one pallet is to be airdropped on this mission), an airspeed of 130 KTS, an altitude of 400 FT AGL, altitude wind speed of 270/18, time to green light as 2:08, surface winds of 252/8, a surface temperature of 28° C., and a QNH of 29.90. This information is updated as conditions change.

On the right side of the screen shot 300, an aircraft symbol 302 overlays a lateral track 304 that the aircraft is expected to follow for the airdrop. The aircraft symbol 302 allows the ground crew to visualize where the aircraft is located with respect to the drop zone. In this example, the aircraft is located between the initial point and the intercept point. Because the aircraft has not reached the stabilization point, the ground crew knows that the guidance computer 126 is still calculating the CARP based on any new airdrop data uplinked to the airborne system 106. Thus, the ground crew may ensure that the ground system 102 is properly functioning and that new data is entered into the interface unit 120 as necessary.

The screen shot 300 also includes a representation of a drop zone 306 overlaid with point of impact information. The drop zone 306 is positioned with respect to the lateral track 304. A wind direction symbol 308 is located in the display to show current altitude wind speed and direction. Additional information may also be provided in the screen shot 300.

Figure 4:
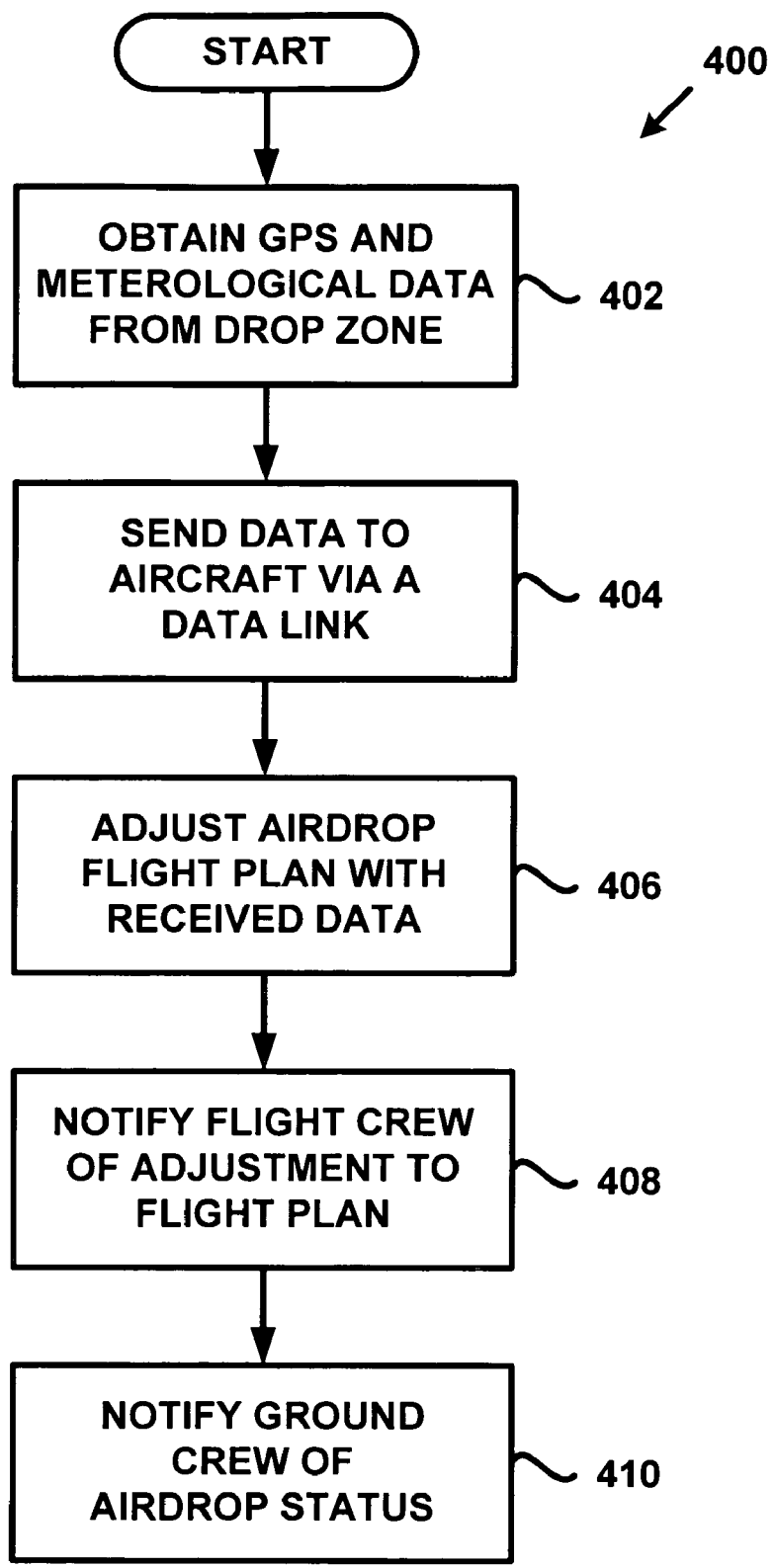
FIG. 4 is a flow diagram of a method for aiding airdrop computations, according to an example.

FIG. 4 is a flow diagram of a method 400 for aiding airdrop computations. At block 402, GPS and meteorological data are obtained from the drop zone. Prior to airdrop, measurements are taken by ground personnel and/or sensors. The measurements include desired point of impact (PI) location, drop zone dimensions, altitude and surface winds, surface temperature, and QNH. The obtained data is either automatically provided to the interface unit 120 or is manually entered by the ground personnel.

At block 404, the data is sent to an aircraft via a data link. The data link is established with the inbound aircraft and the drop zone data is uplinked and received by the airborne data link unit 124. The airborne data link unit 124 provides the drop zone data to the guidance computer 126.

At block 406, a flight plan is adjusted based on the data sent to the aircraft. The guidance computer 126 determines if uplinked parameters are enough to change location of the CARP. If so, the CARP is automatically adjusted. At block 408, the flight crew is notified of the adjusted flight plan. Additionally, at block 410, the ground crew is notified of the airdrop status.

By providing real time data to the airborne system, an airdrop is more likely to reach its intended target. As a result, the supplies, equipment, and/or personnel can be used for their intended purpose. Additionally, providing real time status of the airdrop maneuver to ground personnel, allows the ground personnel to anticipate and plan for changes in the mission.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A system for aiding airdrop computations, comprising in combination:
    a ground system that includes a first computer that receives data from a plurality of sensors that are located at a drop zone; and
    an airborne system that includes a second computer that calculates a release point for an airdrop maneuver; wherein the ground system and the airborne system communicate via a data link in real time to allow the sensor data received by the first computer to be communicated to the second computer, and wherein the second computer calculates the release point based on the sensor data.

2. The system of claim 1, wherein the second computer communicates status of the airdrop maneuver to the first computer via the data link.

3. The system of claim 1, wherein the plurality of sensors provides position and meteorological data.

4. The system of claim 1, wherein the plurality of sensors includes a Global Positioning System.

5. The system of claim 1, wherein the plurality of sensors includes air data sensors selected from the group consisting of a pilot balloon, a clinometer, an anemometer, a thermometer, and a barometer.

6. The system of claim 1, wherein at least one of the sensors automatically transmits data to the first computer.

7. The system of claim 1, wherein data from at least one of the sensors is manually entered into the first computer.

8. The system of claim 1, wherein the first computer includes a wind calculator algorithm.

9. The system of claim 1, wherein the data link is a Link 16 data link.

10. The system of claim 1, further comprising a first data link unit for communicating data between the first computer and the data link, and a second data link unit for communicating data between the second computer and the data link.

11. The system of claim 10, wherein the first data link unit and the second data link unit are tactical data link units.

12. The system of claim 1, wherein the second computer computes a lateral track for the airborne system to follow during the airdrop maneuver.

13. A method for aiding airdrop computations, comprising in combination:
    receiving substantially real time sensor data from a drop zone via a data link;
    calculating a release point for an airdrop maneuver based on the received sensor data; and
    adjusting a flight plan based on the calculated release point.

14. The method of claim 13, further comprising obtaining the sensor data from the drop zone.

15. The method of claim 13, further comprising notifying flight crew of the adjusted flight plan.

16. The method of claim 13, further comprising providing ground crew a status of the airdrop maneuver via the data link.

17. A method for receiving status of an airdrop maneuver, comprising in combination:
    providing an initial flight plan for an airdrop maneuver to a computer accessible by ground crew; and
    providing an updated flight plan for the airdrop maneuver to the computer via a data link as the airdrop maneuver progresses, wherein the updated flight plan includes an adjustment to a release point, and wherein the adjustment to the release point is based on substantially real time sensor data from a drop zone communicated to an aircraft via the data link.

18. The method of claim 17, wherein the computer displays an aircraft symbol overlaying a lateral track that represents the updated flight plan.

19. The method of claim 18, wherein the release point is depicted on the lateral track.

* * * * *